E. E. GOOD.
MILKING APPARATUS.
APPLICATION FILED JAN. 8, 1918.
1,297,346.
Patented Mar. 18, 1919.
2 SHEETS—SHEET 2.
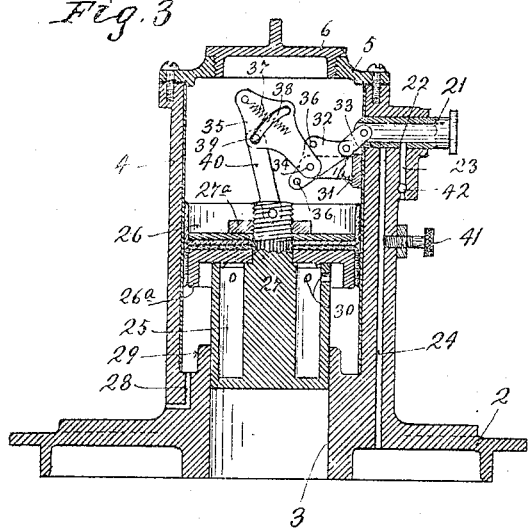
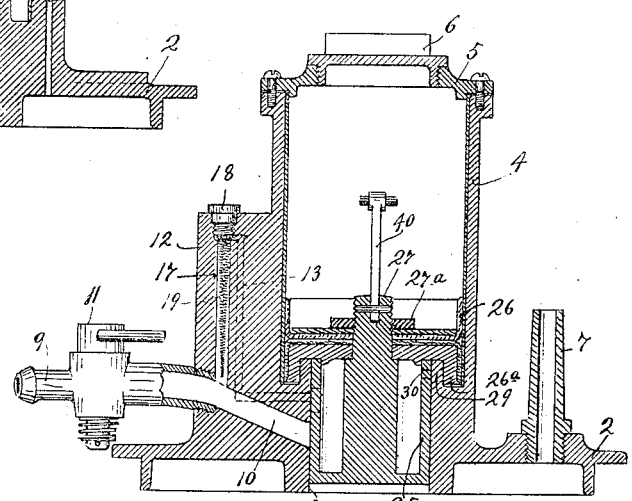
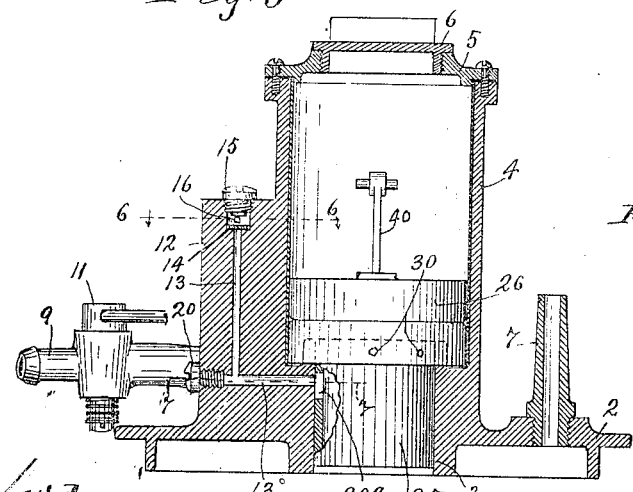
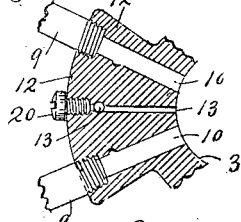
Witnesses.
A. H. Opsahl
E. E. Wells
Inventor
E. E. Good
By his Attorneys.
Williamson Merchant

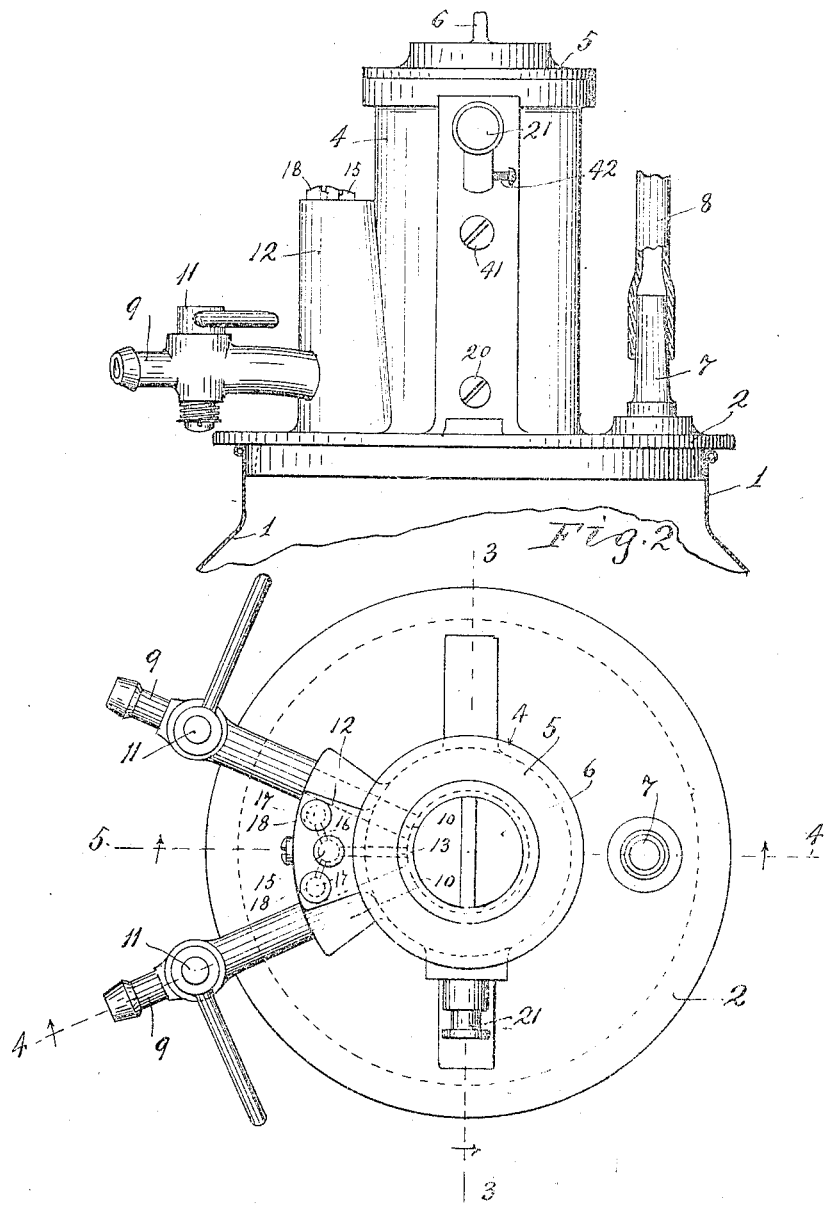

UNITED STATES PATENT OFFICE.

EZRA E. GOOD, OF MINNEAPOLIS, MINNESOTA.

MILKING APPARATUS.

1,297,346.

Specification of Letters Patent. Patented Mar. 18, 1919.

Application filed January 8, 1918. Serial No. 210,817.

*To all whom it may concern:*

Be it known that I, EZRA E. GOOD, a citizen of the United States, residing at Minneapolis, in the county of Hennepin and State of Minnesota, have invented certain new and useful Improvements in Milking Apparatus; and I do hereby declare the following to be a full, clear, and exact description of the invention, such as will enable others skilled in the art to which it appertains to make and use the same.

This invention has for its object to provide an improved milking apparatus and is in the nature of an improvement on the milking apparatus disclosed and broadly claimed in my prior Patent No. 1,228,314, of date, May 29, 1917. Generally stated, the invention consists of the novel devices and combinations of devices hereinafter described and defined in the claims.

The type of milking apparatus disclosed in my present application, a substantially constant partial vacuum is maintained in the milk can or receptacle and the pressure pulsations in the milk tube are produced by a pulsator comprising a differential cylinder and a differential piston therein. The cylinder is preferably cast as an integral part of the cover for the milk receptacle and the cylinder casting and the position are provided with coöperating ports and valve-acting surfaces whereby the partial vacuum or suction is alternately applied, and the top and bottom of the piston and the milk tubes are alternately open for communication with the milk receptacle and the atmosphere to produce the desired pulsating action in the teat cups.

In the accompanying drawings which illustrate the invention, like characters indicate like parts throughout the several views.

Referring to the drawings:

Figure 1 is a side elevation showing the pulsator and a portion of the milk can and receptacle, the latter being in section;

Fig. 2 is a plan view of the pulsator;

Fig. 3 is a section on the line 3—3 of Fig. 2;

Fig. 4 is a section on the line 4—4 of Fig. 2;

Fig. 5 is a section on the line 5—4 of Fig. 2;

Fig. 6 is a fragmentary horizontal section on the line 6—6 of Fig. 5; and

Fig. 7 is a fragmentary horizontal section on the line 7—7 of Fig. 5.

The milk can or receptacle, which may be of any suitable construction, is indicated by the numeral 1 and is shown in part only in Fig. 1. Detachably seated on the rim of this milk receptacle with an air tight joint preferably formed by an interposed gasket, not shown, is a cover 2 preferably having cast integral therewith, a differential cylinder 3—4. The lower extremity of the small cylinder 3 is open to the milk can while the upper end of the large cylinder 4 is closed by a suitable detachable head 5 shown as provided with a detachable air-tight plug 6.

The head 2 has a nipple 7 that opens therethrough into the can or receptacle 1, and to which one end of an air suction tube 8 is attached, said air tube being shown in Fig. 1 only. This air suction tube 8 will be connected to a vacuum pump or other means for producing partial vacuum or suction, preferably through a vacuum tank not shown.

The milking apparatus illustrated is designed for milking two cows at the same time, and hence, the head 1 is provided with two milk delivery nipples 9 that terminate in ports 10 located in the lower portion of the wall of the smaller cylinder 3. The valves 11, which must be open when the apparatus is in operation, are applied in the nipples 9. Between the nipples 9, the cylinder casting is provided with an offset port casing 12, that is formed with an L-shaped air channel 13, the lower end of which opens into the smaller cylinder 3 at a point considerably higher up than the extremities of the milk ports 10. The upper extremity of this air channel 13 is enlarged to form a seat for the small disk-like check valve 14 which permits an upward but checks a downward flow of air through said channel. The upper extremity of the large upper end portion of the channel 13 is tightly closed by a plug 15 and at points between said plug and the check valve 14, the enlarged extremity of said channel 13 is provided with small laterally extended upper branch channels 16 which, in turn, communicate, each with the downwardly extended channel 17, (see Figs. 5 and 6). At their lower extremities, these air channels 17 open into the milk ports 10. The upper extremities of the channels 17 are tightly closed by plugs 18 to which closely coiled conical springs 19 are attached at their upper ends. Said springs 19 extend nearly or quite through the channels 17 and they serve a sort of combined strainers and choke devices that prevent the air from rushing too rapidly downward through said channels 17 into the milk ports, and also prevent the foam from the milk rising upward through said channels. As these strainers or obstructing coils are attached to the plugs 18, they may be easily removed therewith for the purpose of cleaning the same and cleaning out the ports 17 and associated conduits.

In Fig. 5 numeral 20 indicates a threaded plug that tightly closes the outer extremity of the lower or horizontal portion of the air conduit 13. It will be understood that the said conduit 13 can be most easily made by boring one horizontal hole and then boring a vertical hole that intersects the horizontal hole.

Mounted to reciprocate in a bore extended through the wall of the cylinder 4 and through a boss on the exterior of said cylinder is a tubular so-called reverse valve 21. The outer end of this valve is closed and it is provided with an intermediately located port 22. Under axial movement of the valve 21 its port 22 is adapted to alternately open the upper extremities of air conduits 23 and 24, the former of which leads to the atmosphere, and the latter of which leads to the upper portion of the milk can. The inner extremity of the bore of the valve 21 is in constant communication with the interior of the upper portion of the cylinder 4.

Working within the differential cylinder 3—4 is a differential piston 25—26. The smaller piston 25 works in the smaller cylinder 3, and the larger piston 25 works in the larger cylinder 4. The smaller piston 25 is hollow, but is provided with an axial stem 27 the end of which is threaded, is provided with a nut 27ª and serves to hold together the several elements that make up the said larger piston 26. The annular chamber formed within the lower portion of the cylinder 4 around the piston 25 is continuously open to the atmosphere through an air channel 28. (See particularly Fig. 3.) The piston 26 is provided with a depending annular flange 26ª that is spaced from the upper portion of the piston 25 and is adapted to telescope over an annular flange 29 formed on the lower portion of the cylinder casting and directly engaging with the piston 25. In the upper portion on a line above the lower edge of the flange 26, the wall of the piston 25 is provided with one or more air ports 30 that are adapted to be closed by the flange 29 when the differential piston is in its lowermost position; and at a point considerably below said ports 30, the lateral wall of said piston 25 is provided with an air port 30ª which, when the piston is lowered, as shown in Fig. 5, opens the lower extremity of air channel 13.

The numeral 31 indicates a small bearing bracket which is rigidly secured to the interior of the cylinder 4 above the highest position of the piston 26, and to this bracket a rocker 32 is intermediately pivoted. (See Fig. 3). The upper end of this rocker is connected by a short link 33 to the inner end of the reverse valve 21. The rocker 32 is thus pivoted to the bracket 31 by a pivot 34 that also affords a pivot for a so-called accelerator lever 35 which lever has vertically spaced stop pins or lugs 36 located on rocker 32 eccentric to its pivot, one above and one below the pivoted end of the lever 35. Numeral 37 indicates an accelerator spring, the lower end of which is anchored to the base of the bracket 31, and the free end of which is attached to the free end of the accelerator lever 35. The accelerator lever 35 has a segmental slot 38 in which works a pin 39 on the upper end of a link 40, the lower end of which link is pivoted to the projecting upper end of the stem 27 of the differential piston.

The construction and operations of the rocker accelerator arm under the action of the differential piston and of the accelerator spring are more fully disclosed in my prior patent above identified, and will be here repeated only in so far as necessary to bring out the relation thereof to other features of the device and particularly to the action of the piston on the milk tube conduits and air relief conduits.

It will, of course, be understood that the milk delivery nipples 9 will in practice be connected to the respective groups of teat cups by flexible tubes such as rubber hose, the construction and operation of which devices are well known and, hence, not here illustrated.

The conducting capacity of the air channel 24 may be varied by means of a threaded choke valve 41 (see Fig. 3), and the conducting capacity of the air channel 23 may likewise be varied by a similar threaded choke valve 42 (see Figs. 1 and 3).

*Operation.*

The operation of the above described milking apparatus is substantially as follows:

Fig. 3 illustrates what may be assumed to be the starting, to-wit, the uppermost positions of the differential piston and coöperating devices. At this time the air under atmospheric pressure is admitted into the upper portion of the cylinder 4, through the air channel 23, valve port 22, and tubular valve 21, and the air channel 24, which leads to the milk receptacle is closed by the said valve 21, so that the suction or partial vacuum from within the milk can or receptacle does not at this time act upon the large piston 26, but does act directly upon the small piston 27 of the differential piston. In this position of the parts, atmospheric pressure tends to force the reverse valve 21 inward, but the said valve is then locked against such movement by the rocker 32 and link 33 which elements 32 and 33 then act as a toggle that is set with its intermediate joint slightly below a dead center. In this position it will also be noted that the accelerator lever 35 by the spring 37 is then held against the upper stop pin 36 of the rocker and the rocker is stopped against the base of the bracket 31. Also in the said position of the parts shown in Fig. 3, air under atmospheric pressure fills the cavity of the smaller piston 25 and the space within the lower portion of the cylinder surrounding said smaller piston, through air channel 28 and ports 30. Also at this time, port 30$^a$ is far above the lower extremity of air channel 13 and the latter is closed by piston 25, but the lower end of said piston 25 is above milk ports 10 so that the latter are then open, allowing the partial vacuum or suction from the can to draw the milk from the teat cups through the milk delivery conduits, including the said ports 10 and into the milk can or receptacle.

When the differential piston and accelerator lever, under the action of partial vacuum in the milk can, begin their downward movement, the reverse valve will not immediately follow the same. The initial downward movement of the differential piston carries the accelerator lever 35 with it until the accelerator spring 37 has moved past its neutral, or dead center, position in respect to the pivot 34, whereupon the said spring throws said accelerator lever ahead and downward with a rapid movement causing the same to strike the lower stop pin 36 of the rocker 32 and thereby with a quick, hammerlike blow to oscillate said rocker 32 and cause the reverse valve 21 to quickly move into a position to close the atmospheric air channel 23 and open the air channel 24, thereby connecting the milk can to the upper portion of the cylinder 4 and subjecting the large piston 26 to the partial vacuum or suction from the milk can.

The length of the segmental slots 38 in the accelerator lever 35 should be such as to permit the above rapid movement of the accelerator lever 35 and valve 21 actuated thereby, without waiting for the continued downward movement of the differential piston. Under the downward movement of the differential piston, the smaller piston 25, first, completely closes the milk ports 10 and when the said differential piston reaches its extreme lowermost position, shown in Figs. 4 and 5, and while the milk ports are still closed, piston port 30$^a$ opens the air channel 13 to the interior of piston 25 while the air ports 30 are then closed by the wall of the smaller cylinder 3. This permits the air from within the cylinder 25 to flow through air channels 13, 16, and 17 to the milk tube conduit and, thus, in itself, to relieve the pressure on the teat cups. However, the relief by air to the teat cups is further augmented by the fact that the piston port 30$^a$ is so extended vertically that it will open the air relief channel 13 for a short interval of time while the piston is moving downward and before the air ports 30 have been closed and while, therefore, there is for a short interval of time during the downward movement of the piston, an open channel to the atmosphere from the milk tubes, through air channels 17, 16, 13, ports 30$^a$, 30, and 28.

This, it has been found in practice, will give the desired relief to the teat cups necessary to produce the pulsations for milking action, but without so completely relieving the suction on the teat cups as to permit them to drop from position, even when not strapped to the cow.

The timing of the downward movement of the differential piston may be varied by adjustments of the choke valve 42, and the timing of the return or upward movement of said differential piston may be regulated by adjustments of the choke valve 41.

Under upward movement of the differential piston, the reverse valve 21 will not be immediately moved therewith, but the accelerator lever 35 will be immediately moved by the said piston, and when the spring 37 is moved past its upper dead center in respect to the pivot 34, it will immediately throw the said lever upward ahead of the piston, causing the same to strike the upper stop pin 36 of the rocker and thereby quickly restoring the said rocker and reverse valve to the position shown in Fig. 3.

In this improved arrangement the piston 25 with its port 30$^a$ is caused to act as a relief valve for admitting air to the milk conduit, or conduits, while the latter are cut off from the suction from within the milk receptacle, and, moreover, a very finely regulated relief of the suction or partial vacuum in the teat cups is produced; also thereby the construction is simplified and the cost reduced.

The drawings of this application illustrate one of the commercial forms of the apparatus embodying my present invention.

What I claim is:

1. In a milking apparatus, the combination with a closed milk receptacle, of a differential cylinder and a differential piston working therein, said sylinder having its small end in communication with said receptacle, a reverse valve and coöperating ports for alternately connecting the larger end of said cylinder to said milk receptacle and to the atmosphere, piston actuated connections for moving said reverse valve, a milk delivery conduit connected to the smaller end of said cylinder, and an air relief port extending from said milk delivery conduit to the atmosphere and including a port that is arranged to be opened and closed by said differential piston.

2. In a milking apparatus, the combination with a closed milk receptacle, of a differential cylinder and a differential piston working therein, said cylinder having its small end in communication with said receptacle, a reverse valve and coöperating ports for alternately connecting the larger end of said cylinder to said milk receptacle and to the atmosphere, piston actuated connections for moving said reverse valve, a milk delivery conduit connected to the smaller end of said cylinder, an air relief port extending from said milk delivery conduit to the atmosphere and including a port that is arranged to be opened and closed by said differential piston, and a check valve in said air relief conduit permitting a flow of air into said milk tube but checking a reverse flow.

3. In a milking apparatus, the combination with a closed milk receptacle, of a differential cylinder and a differential piston working therein, said cylinder having its small end in communication with said receptacle, a reverse valve and coöperating ports for alternately connecting the larger end of said cylinder to said milk receptacle and to the atmosphere, piston actuated connections for moving said reverse valve, a milk delivery conduit connected to said milk receptacle through a port located in the wall of the small portion of said differential cylinder and arranged to be opened and closed by the small portion of the said differential piston, an air relief conduit extending from said milk tube to the atmosphere and including a port arranged to be opened and closed by said differential piston, the said piston operating to open and close the noted ports of said milk conduit and air relief conduit in alternate order.

4. In a milking apparatus, the combination with a closed milk receptacle, of a differential cylinder and a differential piston working therein, said cylinder having its small end in communication with said receptacle, a reverse valve and coöperating ports for alternately connecting the larger end of said cylinder to said milk receptacle and to the atmosphere, piston actuated connections for moving said reverse valve, a milk delivery conduit connected to said milk receptacle through a port located in the wall of the small portion of said differential cylinder and arranged to be opened and closed by the small portion of the said differential piston, an air relief conduit extending from said milk tube to the atmosphere and including a port arranged to be opened and closed by said differential piston, the said piston operating to open and close the noted ports of said milk conduit and air relief conduit in alternate order, and a check valve in said air relief conduit.

5. In a milking apparatus, the combination with a closed milk receptacle, of a differential cylinder and a differential piston working therein, said cylinder having its small end in communication with said receptacle, a reverse valve and coöperating ports for alternately connecting the larger end of said cylinder to said milk receptacle and to the atmosphere, piston actuated connections for moving said reverse valve, a milk delivery conduit connected to said milk receptacle through a port located in the wall of the small portion of said differential cylinder and arranged to be opened and closed by the small portion of the said differential piston, an air relief conduit extending from said milk tube to the atmosphere and including a port arranged to be opened and closed by said differential piston, the said piston operating to open and close the noted ports of said milk conduit and air relief conduit in alternate order, a check valve in said air relief conduit and a coiled spring in said air relief conduit operating as a strainer and retarding device.

6. In a milking apparatus, the combination with a closed milk receptacle, of a differential cylinder and a differential piston working therein, said cylinder having its small end in communication with said receptacle, a reverse valve and coöperating ports for alternately connecting the larger end of said cylinder to said milk receptacle and to the atmosphere, piston actuated connections for moving said reverse valve, a milk delivery conduit connected to said milk receptacle, said ports that are controlled by said reverse valve and which lead, respectively to the atmosphere and to the milk receptacle having independent means for varying their conducting capacity, whereby the two reciprocating movements of said piston may be independently regulated as to time intervals.

7. In a milking apparatus, the combination with a closed milk receptacle, of a differential cylinder and a differential piston working therein, said cylinder having its small end in communication with said receptacle, a reverse valve and coöperating ports for alternately connecting the larger end of said cylinder to said milk receptacle and to the atmosphere, piston actuated connections for moving said reverse valve, a milk delivery conduit connected to said milk receptacle, a piston controlled air relief conduit extending from said milk tube to the atmosphere, and a closely coiled spring interposed in said air relief conduit and serving as a combined strainer and retarding device.

8. In a milking apparatus, the combination with a closed milk receptacle, of a differential cylinder and a differential piston working therein, said cylinder having its small end in communication with said receptacle, a reverse valve and coöperating ports for alternately connecting the larger end of said cylinder to said milk receptacle and to the atmosphere, piston actuated connections for moving said reverse valve, a milk delivery conduit connected to said milk receptacle, said milk receptacle opening into said milk tube through a port in the wall of the small portion of said differential cylinder, an air relief conduit extending from said milk tube to the atmosphere, and including a port located in the wall of the small portion of said differential cylinder, above the port of said milk conduit, the small portion of said piston serving to open and close said two ports in alternate order, and a check valve in said air relief conduit.

9. In a milking apparatus, the combination with a closed milk receptacle, of a differential cylinder and a differential piston working therein, the smaller portion of said cylinder opening into said receptacle, the inner end of the large portion of said cylinder being open to the atmosphere, and the small portion of said piston being hollow and having air receiving and delivery ports in its cylindrical wall, a milk conduit opening into said milk receptacle through a port that is located in the wall of the small portion of said differential cylinder, an air venting conduit leading from said milk conduit to a vent port located in the wall of the smaller portion of said cylinder, at a point outward of the port of said milk conduit, and means for reciprocating said piston, the smaller portion of said piston, when reciprocated, serving to open and close the ports of said milk conduit and air venting conduit in alternate order, the opening of the air venting conduit being through the interior of said hollow piston and the receiving and delivery ports thereof.

10. In a milking apparatus, the combination with a closed milk receptacle, of a differential cylinder and a differential piston working therein, the smaller portion of said cylinder opening into said receptacle, the inner end of the large portion of said cylinder being open to the atmosphere, and the small portion of said piston being hollow and having air receiving and delivery ports in its cylindrical wall, a milk conduit opening into said milk receptacle through a port that is located in the wall of the small portion of said differential cylinder, an air venting conduit leading from said milk conduit to a vent port located in the wall of the smaller portion of said cylinder, at a point outward of the port of said milk conduit, means for reciprocating said piston, the smaller portion of said piston, when reciprocated, serving to open and close the ports of said milk conduit and air venting conduit in alternate order, the opening of the air venting conduit being through the interior of said hollow piston and the receiving and delivery ports thereof, the said piston, when in its outer position, opening said milk delivery port, and when in its innermost position, the air delivery port thereof being in registration with the port of said air vent and the air receiving ports of said piston being then closed by the smaller portion of said cylinder.

11. In a milking apparatus, the combination with a closed milk receptacle, of a differential cylinder and a differential piston working therein, the smaller portion of said cylinder opening into said receptacle, the inner end of the large portion of said cylinder being open to the atmosphere, and the small portion of said piston being hollow and having air receiving and delivery ports in its cylindrical wall, a milk conduit opening into said milk receptacle through a port that is located in the wall of the small portion of said differential cylinder, an air venting conduit leading from said milk conduit to a vent port located in the wall of the smaller portion of said cylinder, at a point outward of the port of said milk conduit, means for reciprocating said piston, the smaller portion of said piston, when reciprocated, serving to open and close the ports of said milk conduit and air venting conduit in alternate order, the opening of the air venting conduit being through the interior of said hollow piston and the receiving and delivery ports thereof, the said piston, when in its outer position, opening said milk delivery port, and when in its innermost position, the air delivery port thereof being in registration with the port of said air vent and the air receiving ports of said piston being then closed by the smaller portion of said cylinder, and a check valve in said air venting conduit permitting a flow of air into said milk tube but checking a reverse flow.

12. In a milking apparatus, the combination with a closed milk receptacle, of a differential cylinder and a differential piston working therein, the smaller portion of said cylinder opening into said receptacle, the inner end of the large portion of said cylinder being open to the atmosphere, and the small portion of said piston being hollow and having air receiving and delivery ports in its cylindrical wall, a milk conduit opening into said milk receptacle through a port that is located in the wall of the small portion of said differential cylinder, an air venting conduit leading from said milk conduit to a vent port located in the wall of the smaller portion of said cylinder, at a point outward of the port of said milk conduit, the smaller portion of said piston, when reciprocated, serving to open and close the ports of said milk conduit and air venting conduit in alternate order, the opening of the air venting conduit being through the interior of said hollow piston and the receiving and delivery ports thereof, said piston, when in its outer position, opening said milk delivery port, and when in its innermost position, the air delivery port thereof being in registration with the port of said air vent and the air receiving ports of said piston being then closed by the smaller portion of said cylinder, a check valve in said air venting conduit permitting a flow of air into said milk tube but checking a reverse flow, and means for reciprocating said piston comprising a reverse valve, coöperating ports for alternately connecting the larger end of said cylinder to said milk receptacle and to the atmosphere, and piston actuated connections for moving said reverse valve.

13. In a milking apparatus, the combination with a head structure including a cylinder, said head structure having a milk delivery conduit terminating in a port located in the wall of said cylinder, said head further having an air vent therein extended through said cylinder and connected to said milk tube within said head structure, of a piston working within said cylinder to produce suction pulsations and operating to alternately open and close said milk conduit and air vent in alternate order.

14. In a milking apparatus, the combination with a cylinder and piston and means for reciprocating said piston, of a milk delivery conduit having a port opening through a wall of said cylinder, an air venting conduit leading from said milk conduit and comprising a port also located in the wall of said cylinder, the said piston being arranged to open and close said two ports in alternate order, and a check valve in said air venting conduit.

15. In a milking apparatus, the combination with a milk receptacle, of a cylinder and coöperating piston, means for reciprocating said piston, said cylinder having a milk inlet port and a discharge opening, said piston having an internal air cavity with receiving and delivery ports, an air venting conduit having a port located in the wall of said cylinder, the said piston in its outer position opening said milk port and the air receiving ports to its air cavity, and said piston when in its inner position, closing said milk port and the said air receiving port and opening its air cavity to said air venting conduit through said air delivery port.

16. In a milking apparatus, the combination with a milk receptacle, of a cylinder and coöperating piston, means for reciprocating said piston, said cylinder having a milk inlet port and a discharge opening, said piston having an internal air cavity with receiving and delivery ports, an air venting conduit having a port located in the wall of said cylinder, the said piston in its outer position opening said milk port and the air receiving ports of its air cavity, and said piston when in its inner position, closing said milk port and the said air receiving port and opening its air cavity to said air venting conduit through said air delivery port, and a check valve in said air venting conduit.

17. In a milking apparatus, the combination with a cylinder and coöperating piston, said piston having an air cavity with air receiving and delivery ports, a milk delivery conduit arranged to be opened and closed by said piston, and an air venting conduit to said milk conduit, said cylinder and piston coöperating to close said air cavity from the atmosphere and to open the same to said air venting conduit when said piston is in a closed position.

In testimony whereof I affix my signature in presence of two witnesses:

EZRA E. GOOD.

Witnesses:
CLARA DEMAREST,
F. D. MERCHANT.